(12) United States Patent
Wojcik et al.

(10) Patent No.: US 6,375,781 B1
(45) Date of Patent: Apr. 23, 2002

(54) APPARATUS AND HIGH SPEED PROCESS FOR MAKING HIGHLY STRETCHED FILM

(75) Inventors: John P. Wojcik, Long Grove; Deepak H. Mehta, Naperville; Donald L. Van Erden, Wildwood, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/429,147

(22) Filed: Oct. 28, 1999

(51) Int. Cl.⁷ .............................. B32B 31/00
(52) U.S. Cl. ................... 156/229; 156/495; 156/555; 428/98
(58) Field of Search ................ 156/229, 494, 156/495, 555, 582; 428/98

(56) References Cited

U.S. PATENT DOCUMENTS

| | | | |
|---|---|---|---|
| 4,017,251 A | 4/1977 | Coburn et al | 425/404 |
| 4,436,788 A | 3/1984 | Cooper | 428/483 |
| 4,504,434 A | 3/1985 | Cooper | 264/22 |
| 4,905,451 A | 3/1990 | Jaconelli et al. | 53/410 |
| 5,112,674 A | 5/1992 | German et al. | 428/216 |
| 5,114,763 A | 5/1992 | Brant et al. | 428/34.9 |
| 5,147,709 A | 9/1992 | Dohrer et al. | 428/213 |
| 5,234,731 A | 8/1993 | Ferguson | 428/34.9 |
| 5,272,016 A | 12/1993 | Ralph | 428/516 |
| 5,279,872 A | 1/1994 | Ralph | 428/34.9 |
| 5,460,861 A | 10/1995 | Vicik et al. | 428/34.9 |
| 5,531,393 A | 7/1996 | Salzsauler et al. | 242/160.4 |
| 5,538,790 A | 7/1996 | Arvedson et al. | 428/349 |
| 5,565,222 A | 10/1996 | Scherer | 425/500 |
| 5,569,693 A | 10/1996 | Doshi et al. | 524/317 |
| 6,070,394 A * | 6/2000 | Somers et al. | 53/441 |
| 6,265,055 B1 * | 7/2001 | Simpson et al. | 428/213 |

FOREIGN PATENT DOCUMENTS

GB    2 038 845    7/1980

OTHER PUBLICATIONS

German, *Effect of Processing Variables on LLDPE Stretch Film Cling*, 1988 Polymers, Laminations and Coatings Conference, pp. 445–495.
DeVet, *What Are The Prospects For Metallocene LLDPE In Linear Oriented Films!*, Slide Presentation by Exxon Chemical Company, Dec., 1998.
Brant, et al., *Film Property Enhancements by Orienting Exceed mLLDPE*, Article by Exxon Chemical Company, Sep., 1997.
*Primplast*, Brochure by The Dow Chemical Group.

\* cited by examiner

*Primary Examiner*—James Sells
(74) *Attorney, Agent, or Firm*—Pauley Petersen Kinne & Erickson

(57) ABSTRACT

An apparatus and high speed process for heating and stretching a film having a bridle mechanism comprising a first heated roll and a second heated roll. The film is stretched as the film is transferred from the first heated roll to the second heated roll which rotates at a speed greater than the speed at which the first heated roll rotates. The film is fed into the bridle mechanism at a rate of about 1,500 fpm to about 2,500 fpm wherein it is stretched to a length that is up to about 450% greater than its initial, pre-stretched length. The increased contact between the large diameter heated rolls and the film and the short draw gap between the two heated rolls result in a highly stretched film having minimal neck-in.

13 Claims, 1 Drawing Sheet

APPARATUS AND HIGH SPEED PROCESS FOR MAKING HIGHLY STRETCHED FILM

FIELD OF INVENTION

This invention is directed to an apparatus and a high speed process for making a highly stretched film. A stretchable film is fed through the apparatus at a rate of up to 2,500 fpm wherein the film is heated and stretched by about 100–450% of its initial length, to an ultimate length that is about 200–550% of the initial length.

BACKGROUND OF INVENTION

Prior art processes for stretching a film include processes wherein the film is heated before it is mechanically stretched, known in the art as "hot" processes. Hot processes may be either in-line or off-line. Prior art stretching apparatus used in hot processes comprise a substantial number of stretch rolls. Further, these stretch rolls are spaced at large distances from successive rolls. As the film is fed through the apparatus, the film has minimum contact with the stretching rolls. As a result, the stretched film exhibits a considerable amount of neck-in as well as wrinkles, tears and/or holes. Hot processes are limited by moderate draw or stretch ratios, slow process speeds and temperature.

Prior stretching processes also include a "cold" process whereby a film is mechanically stretched without heating the film. Cold processes can be in-line or off-line processes. When compared to hot processes, cold processes require a greater stretching or elongating force to stretch the film and the resulting film is stretched less. Cold processes are limited by low draw or stretch ratios, and poor film performance and film appearance.

Because of the limitations encountered during prior art stretching processes, an apparatus and process are needed to produce a highly stretched film at greater processing speeds having high tensile and puncture strength, less neck-in and greater clarity and performance.

SUMMARY OF THE INVENTION

The present invention is directed to an apparatus and high speed process for making a highly stretched film. The apparatus and process, which are used for hot stretching, may be used in-line (wherein a film is extruded and stretched before storage or use) or off-line (wherein a film is extruded and stored before stretching). Compared to prior art hot stretching apparatus and processes, the apparatus and process of the invention use fewer and larger draw rollers, operate at higher line speeds with lower draw distance between rollers, and produce films with higher draw ratios and less neck-in.

An apparatus and process according to one preferred embodiment of this invention comprise a bridle mechanism having a first heated roll and a second heated roll for heating and stretching a film.

Preferably, the first heated roll and the second heated roll have an outer diameter of at least 18 inches permitting maximum contact with the film. The first heated roll and second heated roll further comprise an outer mirror surface.

Due to the smoothness of the outer mirror surfaces and the heat transferred from the heated rolls to the film, the film can be fed through the bridle mechanism without slippage. High stretch ratios, up to about 5.5:1, result from increased adhesion of the film to the outer mirror surface of the heated rolls.

In the high speed process of this invention, an extrusion process or supply roll supplies a stretchable film to the apparatus at a rate of up to 1,000 feet per minute (fpm), preferably between 300 fpm and 1,000 fpm. The film is fed between a stretch nip and the first heated roll and adheres to the first heated roll. As the film is passed around the rotating heated rolls, the film is heated. The heated rolls are heated by methods known to those skilled in the art, including internal steam, water, oil and electricity.

Initially, the film passes around the first heated roll. The film then separates from the first heated roll and is drawn to the second heated roll, which rotates at a speed greater than the first heated roll. As a result of the increased rotational speed of the second heated roll, the film is subjected to a stretching or elongating force as the film transfers from the first heated roll to the second heated roll.

Preferably, the closest distance between the first heated roll and the second heated roll is kept to a minimum. The tangential distance between the point where the film separates from the first heated roll and the point where the film contacts the second heated roll, known as the draw gap, preferably is about 0.25 inch to about 1.0 inch. Due to the use of only two heated rolls and the short draw gap, the film can be highly stretched with minimal neck-in. After stretching, the film is passed around the second heated roll.

After leaving the second heated roll, the film is annealed and wound onto a core. The film is allowed to relax (i.e., shrink) up to about 20% of the increase in length due to stretching, preferably in the range of 5% to about 15%, as the film advances between the second heated roll and the core. After relaxing, the film remains up to about 450% longer than its initial, pre-stretched length.

With the foregoing in mind, it is one feature and advantage of this invention to provide an apparatus and a high speed process for heating and stretching a film to a length which is about 100–450% longer than its initial, pre-stretched length.

It is another feature and advantage of this invention to provide an apparatus and a high speed process for heating and stretching a film at a rate of up to about 2,500 fpm.

It is another feature and advantage of this invention to provide an apparatus and process for heating and stretching a film having a minimal number of heated rolls and a small draw gap to maximize contact with the film, and minimize neck-in and slippage of the film on the rolls.

It is yet another feature and advantage of this invention to provide an improved stretched film that is heated and stretched to a length that is about 100–450% longer than its initial pre-stretched length having greater clarity, higher gloss, lower haze, higher tensile and puncture strength, less neck-in and lower noise level.

The foregoing and other features and advantages of this invention will become further apparent from the following detailed description of the preferred embodiments, read in conjunction with the drawing.

DETAILED DESCRIPTION OF THE PRESENTLY PREFERRED EMBODIMENTS

Figure 1:
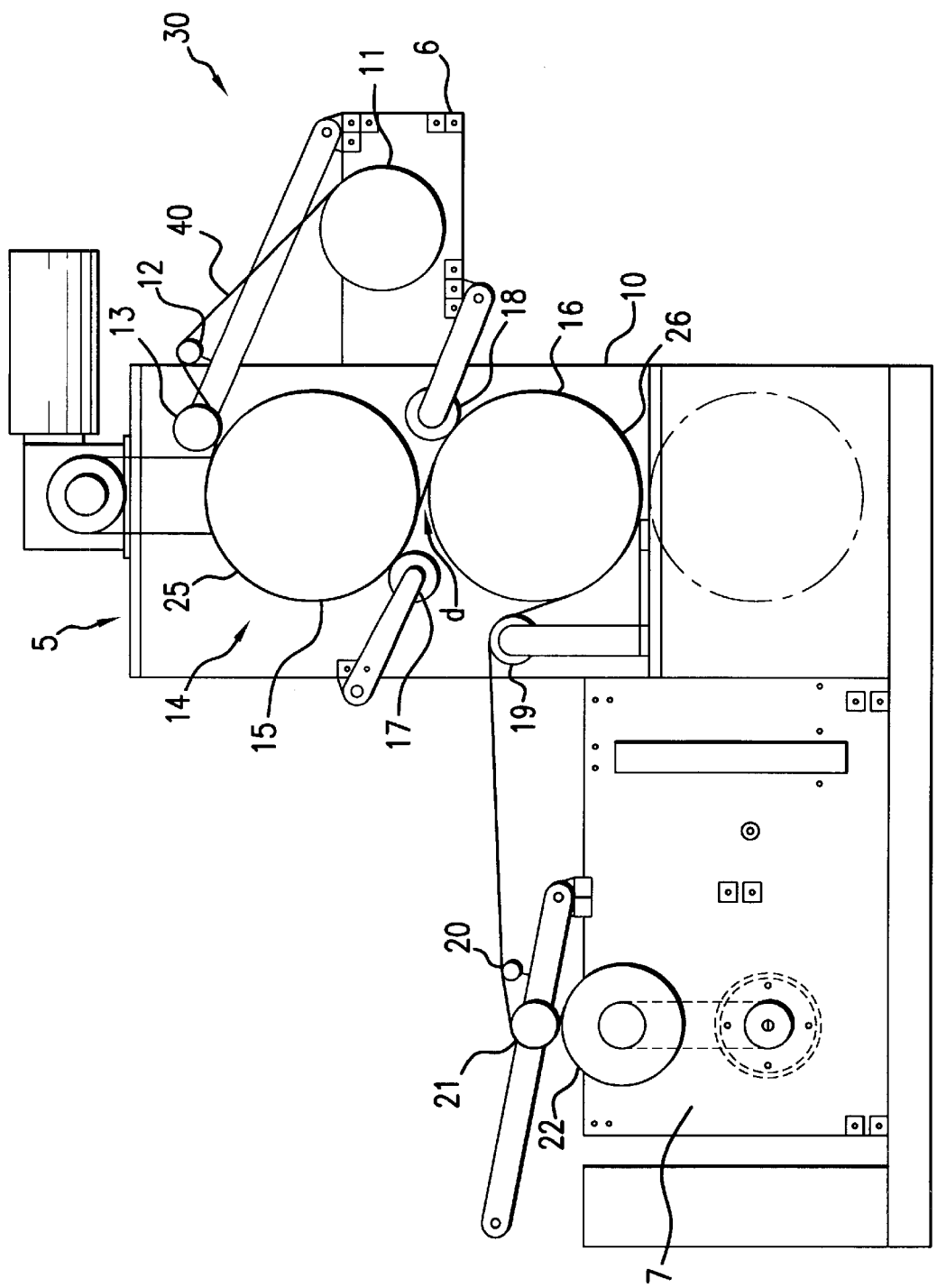
FIG. 1 is a diagrammatic side view of the high speed stretching apparatus according to one preferred embodiment of the invention.

Referring to FIG. 1, an apparatus 5 and a high speed process for heating and stretching a film 40 in accordance with the present invention are disclosed.

Apparatus 5 comprises a supply roll 11 rotatably connected to an inlet portion 6 of a frame 10. As indicated above, supply roll 11 is utilized if apparatus 5 is used to stretch films off-line. Supply roll 11 may be omitted if apparatus 5 is used in an in-line process and fed from an extrusion apparatus. Supply roll 11 supplies apparatus 5 with a stretchable film 40 of any known composition. For example, such films are often composed of polyethylene, polyvinyl chloride, ethylene vinyl acetate, ethylene methyl acetate, and ethylene copolymers with higher alpha olefins.

A bridle mechanism 14 is connected to frame 10 and includes a first heated roll 15 and a second heated roll 16 operatively connected to frame 10. First heated roll 15 and second heated roll 16 are rotatably mounted to frame 10 and are preferably driven by independent motors at different speeds or, alternatively, separate gear assemblies of different sizes driven by a common motor. Second heated roll 16 rotates at a speed greater than the speed at which first heated roll 15 rotates during operation of apparatus 5.

First heated roll 15 and second heated roll 16 preferably are made of chrome plated steel, but may be made of polished aluminum or other metals having a smooth surface. Rolls 15 and 16 may each have an outer diameter (OD) of at least 12 inches, preferably at least 18 inches. Prior art rolls generally have an outer diameter of about 2.5 inches to about 6 inches. The width of first heated roll 15 and second heated roll 16 depend on the desired width of the film to be produced. In one embodiment the rolls each have a width of about 64 inches. The large outer diameter and smoothness of heated rolls 15 and 16 permit maximum contact with film 40. Also, rolls 15 and 16 are positioned very close to each other and may, for instance, have a gap of about 0.01 inch between their closest points. By placing rolls 15 and 16 close together, the tangential draw distance "d" is minimized. Referring to FIG. 1, the draw distance "d" refers to the length of film 40 between rolls 15 and 16 that does not touch either roll at any given instant. The draw distance "d" should be about 0.25–1.0 inch, preferably about 0.50–0.75 inch.

The combination of high surface contact and short draw distance minimizes neck-in. Neck-in is a reduction in the width of the film as the film is being stretched and is a result of poor contact between the film and the stretching members, too many stretching members, and/or large distances between successive stretching members. Neck-in of 12-inch wide films made by the present process is less than 15%, preferably about 10% or less.

To achieve the surface smoothness, first heated roll 15 and second heated roll 16 may each have mirror surfaces 25 and 26, respectively. Outer mirror surfaces 25 and 26 may have a surface finish variation, that varies from a lowest point to a highest point, between about 0 microns and about 10 microns, preferably between about 0 microns and about 5 microns. The smooth surface finish and the heat transferred from heated rolls 15 and 16 to film 40 permit greater adhesion of film 40 to heated rolls 15 and 16. Therefore, film 40 can be fed through bridle mechanism 14 without slippage of film 40, resulting in high stretch ratios. Further, the heat minimizes film width fluctuation due to the higher coefficient of friction between film 40 and outer mirror surfaces 25 and 26.

A first stretch nip 13 is rotatably connected to frame 10 and operatively connected to supply roll 11. First stretch nip 13 preferably is made of rubber and has an outer diameter of less than about 10 inches, suitably about 4–6 inches. First stretch nip 13 applies pressure, preferably about 2–10 pounds per linear inch (pli), suitably about 5 pli, against outer mirror surface 25 of first heated roll 15. First stretch nip 13 minimizes film slippage and reduces air entrapment.

Due to the smoothness of outer mirror surface 25, film 40 can be fed through first stretch nip 13 without slippage, thus preventing formation of wrinkles and/or holes in film 40.

In one preferred embodiment of this invention, a second stretch nip 17 and a third stretch nip 18 are rotatably connected to frame 10. Second stretch nip 17 and third stretch nip 18 are preferably made of rubber and have an outer diameter of less than about 8 inches, suitably about 4 inches. Second stretch nip 17 applies pressure, preferably about 2–10 pli, suitably about 5 pli, against outer mirror surface 25 of first heated roll 15 and third stretch nip 18 applies similar pressure against outer mirror surface 26 of second heated roll 16. Second stretch nip 17 and third stretch nip 18 pinch film 40 against respective heated rolls 15 and 16 as film 40 is being stretched between rolls 15 and 16, thus minimizing slippage.

Upon leaving heated roll 16, film 40 passes between heated roll 16 and first idler roll 19, which travels at the same tangential speed as roll 16. A small pressure of about 2–10 pli can be applied between these rolls. A guide roll 20, lay-on roll 21 and core (film roll) 22 are mounted to frame 10 downstream from rolls 16 and 19. Lay-on roll 21 and core 22 turn at a slower tangential speed than rolls 16 and 19, permitting the film to relax (i.e., shrink) after leaving roll 19. The level of relaxation is less than 15% of the amount of stretching, preferably about 10% or less. For instance, a one-foot long film sample may be stretched by four feet to a length of five feet, and then relaxed by 10% of four feet, to yield a final length of 4.6 feet. The annealed film is wound and stored on core 22, which periodically becomes full and is replaced.

In one preferred embodiment of this invention, a cast film having a thickness of about 23 microns comprising at least three layers having a first outer layer, a second outer layer and a core layer is heated and stretched. The first outer layer comprises a very low density polyethylene (hereinafter VLDPE) comprising copolymers of ethylene with an alpha-olefin, available from Dow Chemical as Dow SC4105. The first outer layer has a thickness of about 2.8 microns. The VLDPE polymer has a density of about 0.910 to about 0.911 g/cc and a melt index (MI) of 3.3 dg/min.

The second outer layer and the core layer include an octene LLDPE available from Dow Chemical as Dow 2288. The second outer layer has a thickness of about 1.8 microns. The core layer has a thickness of about 18.4 microns. The LLDPE polymer in these layers has a density of about 0.917 g/cc.

In another embodiment, a blown film having a thickness of about 20 microns including at least three layers having a first outer layer, a second outer layer and a core layer is heated and stretched. The first outer layer having a thickness of about 1.6 microns includes a VLDPE plastomer, which can be a metallocene-catalyzed copolymer of ethylene with an alpha-olefin, preferably 1-octene, having a density of about 0.870 g/cc and a MI of 1.0 dg/min. A polymer having these properties is sold by the Dow Chemical Company as Dow EG8100. VLDPE plastomers have lower densities than, and are a different class of materials from, linear low density polyethylene (LLDPE). These plastomers are capable of use in biaxially oriented films having superior properties to comparable films with LLDPE's, including higher tensile strength and greater puncture resistance.

The core layer can be made of an LLDPE copolymer of ethylene with hexene or octene, having a melt index of 1.0, and a density of 0.917–0.920 grams/cc. Suitable polymers include Exxon LL3001 from the Exxon Chemical Company, and Dowlex 2045 from the Dow Chemical Company. The core layer has a thickness of about 16.4 microns.

The second outer layer includes an octene LLDPE having a density of about 0.925 g/cc and an MI of 1.9 dg/min. One such polymer is available from Dow Chemical as Dow LD535I. The second outer layer has a thickness of about 2.0 microns.

The invention is not limited to these particular stretch film polymers, film thicknesses, or film constructions. Other stretch films made of one or more layer combinations and polymers can also be processed with this invention, including materials such as ethylene vinyl acetate (EVA), branched low density polyethylene (LDPE), polypropylene, ethylene methylacrylate (EMA), other VLDPE's and LLDPE's, certain metallocene-catalyzed olefin polymers, and copolymers and terpolymers thereof.

The process of the invention can be described with reference to the apparatus. Referring again to FIG. 1, in a high speed process for heating and stretching film 40, supply roll 11 rotates and film 40 is unwound from supply roll 11 and fed to apparatus 5. Film 40 advances over a first guide roll 12 and is fed between first stretch nip 13 and first heated roll 15. First stretch nip 13 applies pressure, as explained above, against outer mirror surface 25 of first heated roll 15. Film 40 fully engages outer mirror surface 25 of first heated roll 15, free of wrinkles, holes and/or air pockets as a result of the pressure applied by first stretch nip 13 and the smoothness of outer mirror surface 25.

As first heated roll 15 rotates, film 40 is drawn around outer mirror surface 25. Heat is transferred from first heated roll 15 to film 40. First heated roll 15 and second heated roll 16 are heated to a suitable temperature depending on the film composition. This temperature can range from about 100–350° F., suitably about 150–250° F. In the preferred film embodiments described above, a preferred temperature is about 200° F. to about 220° F. Heating of rolls 15 and 16 is accomplished by methods known to those skilled in the art, including internal steam, water, oil and electricity.

Film 40 is then fed through second stretch nip 17 which applies pressure against outer mirror surface 25, after which film 40 separates from first heated roll 15. After a brief separation from both rolls 15 and 16, film 40 is fed through a third stretch nip 18 which applies suitable pressure against outer mirror surface 26 and film 40 adheres to second heated roll 16. As a result of the nipping, and of second heated roll 16 rotating at a speed greater than the speed at which first heated roll 15 rotates, film 40 is stretched as film 40 is transferred between first heated roll 15 to second heated roll 16.

The shortest distance between outer mirror surface 25 of first heated roll 15 and outer mirror surface 26 of second heated roll 16 is known as the roll gap. The roll gap may vary with film thickness and type, and is typically about 0.005–0.08 inch, suitably about 0.01–0.02 inch. The tangential distance between the point where film 40 separates from first heated roll 15 at second stretch nip 17 and the point where film 40 first contacts second heated roll 16 at third stretch nip 18 is known as the draw gap. The draw gap is quite short, and is suitably about 0.25–1.0 inch, preferably about 0.50–0.75 inch. The short draw gap decreases the neck-in associated with prior art stretching apparatuses. Also, the fact that film 40 is only drawn once means that the total draw gap is the same as the single-stage draw gap.

As second heated roll 16 rotates, film 40 is drawn about outer mirror surface 26 and is heated. Film 40 advances over rotatable idler roll 19 and film 40 is wound about core 22.

In one preferred embodiment, a second guide roll 20 and a lay-on roll 21 are operatively connected to idler roll 19 to prevent film slippage and reduce air entrapment, improving the winding process about core 22. Film 40 is allowed to relax (i.e., shrink) up to about 20%, preferably in the range of 5% to about 15%, as film 40 advances between idler roll 19 and second guide roll 20.

High stretch ratios, i.e., the ratio of the final, stretched length of film 40 to the initial, pre-stretched length of film 40, result from the greater adhesion of film 40 to first heated roll 15 and second heated roll 16. The "stretch ratio" is the ratio of the film length after stretching to the initial unstretched length. Thus, a stretch ratio of 2:1 means that a film increases 100% in length due to stretching, while a ratio of 1:1 means there is no (i.e., 0%) stretching. Stretch ratios resulting from the inventive process range up to about 5.5:1, and are preferably between about 2:1 to about 4.5:1. As a result, apparatus 5 and the process of this invention are capable of stretching film 40 by up to about 450%, to a length which is up to about 550% of its initial, pre-stretched length. Further, apparatus 5 and the process of this invention are capable of stretching film 40 at a finished line speed of about 1,000 fpm to about 3,000 fpm, preferably about 1,500 fpm to about 2,500 fpm.

It is to be understood that variations and modifications of the present invention may be made without departing from the scope of the present invention. It is also to be understood that the scope of the present invention is not to be interpreted as limited to the specific embodiments disclosed herein. The scope of the invention is indicated in the appended claims, and all changes that fall within the meaning and range of equivalents are intended to be embraced therein.

We claim:

1. A high speed process for stretching a film at a rate of at least 1,000 feet per minute, which comprises the steps of:
   contacting the film to a rotatable first heated roll;
   passing the film around an outer surface of the first heated roll;
   stretching the film as the film is transferred between the first heated roll and a rotatable second heated roll that rotates at a speed greater than the first heated roll;
   contacting the film to the second heated roll;
   passing the film around an outer surface of the second heated roll; and
   relaxing the film;
   wherein the first and second heated rolls have a draw distance therebetween which does not exceed about 1.0 inch, and a surface variance not exceeding about 10 microns.

2. The process of claim 1, wherein the draw distance is about 0.25–1.0 inch.

3. The process of claim 1, wherein the draw distance is about 0.50–0.75 inch.

4. The process of claim 1, wherein the film is stretched to a length which is about 100%–450% greater than an initial length.

5. The process of claim 1, wherein the film is fed through the first stretch nip at a rate of about 1,500–2,500 feet per minute.

6. The process of claim 1, wherein the first heated roll and second heated roll have an outer diameter of at least 12 inches.

7. The process of claim 1, wherein the first heated roll and the second heated roll have an outer diameter of at least 18 inches.

8. The process of claim 1, wherein the first heated roll and the second heated roll are heated to a temperature of about 150° F. to about 250° F.

9. The process of claim 1, wherein the outer surfaces of the first heated roll and the second heated roll have a surface variance not exceeding about 5 microns.

10. A stretched film produced by the process of claim 1.

11. A high speed process for stretching a film at a rate of at least 1,500 feet per minute, which comprises the steps of:

contacting the film to a rotatable first heated roll having an outer diameter of at least 18 inches;

heating the film as the film is passed around an outer mirror surface of the first heated roll;

stretching the film as the film is transferred from the first heated roll to a rotatable second heated roll that rotates at a speed greater than the first heated roll;

contacting the film to the second heated roll; and heating the film as the film is drawn around an outer mirror surface of the second heated roll;

wherein the outer surfaces of the first and second heated rolls have a surface variance not exceeding about 10 microns.

12. A stretched film produced by the process of claim 11.

13. The process of claim 11, wherein the surface variance does not exceed about 5 microns.

* * * * *